May 24, 1949.  H. L. KINDORF ET AL  2,470,992
BEAM CLAMP FOR CONDUIT SUPPORTS
Filed Jan. 13, 1948
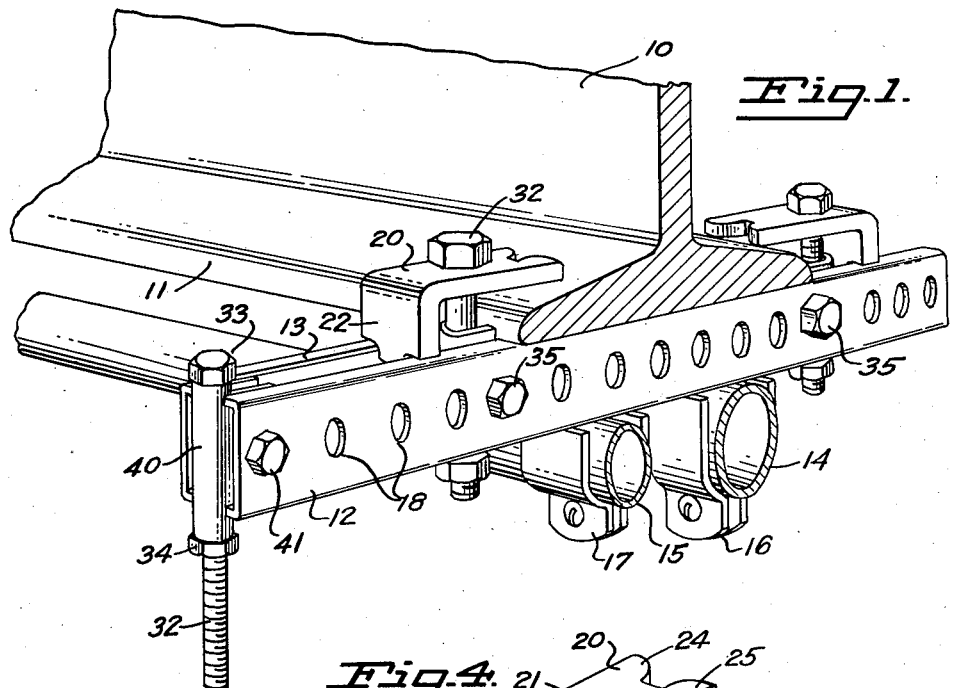
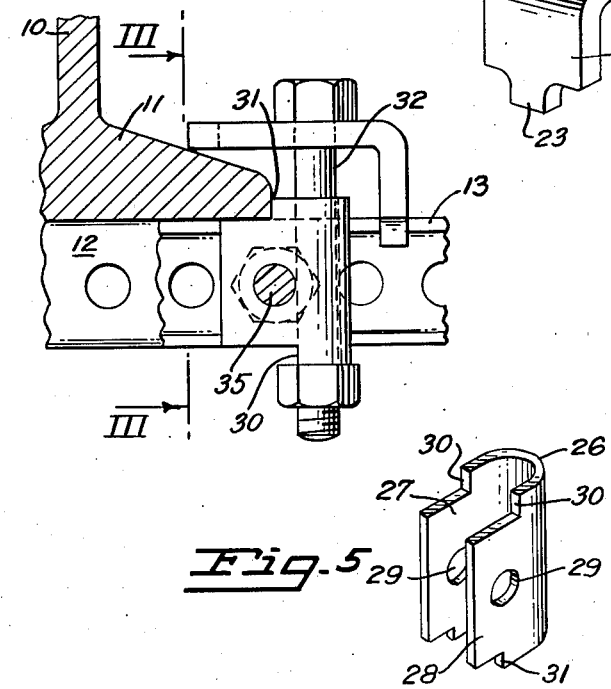
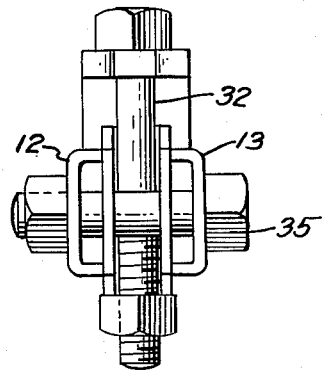
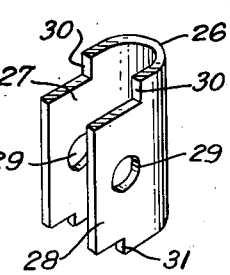
INVENTOR.
HARRY L. KINDORF
ORLAN C. KINDORF
BY
*Charles M. Fryer*
ATTORNEY Patented May 24, 1949

2,470,992

UNITED STATES PATENT OFFICE 2,470,992

BEAM CLAMP FOR CONDUIT SUPPORTS

Harry L. Kindorf and Orlan C. Kindorf,
San Francisco, Calif.

Application January 13, 1948, Serial No. 2,055

5 Claims. (Cl. 248—72)

This invention relates to beam clamps for conduit supports.

One type of conduit support now in general use comprises beams or supporting members made up of pairs of channel shaped members arranged in opposite relation so that the spaces between the flanges of the channels provide what are in effect slots adapted to receive a well known type of pipe clamp or strap for securing conduits or cables against the beams. Various methods are in use for connecting these slotted beams to each other and to structural members for fabricating supporting frame works of any required shape. One common method of supporting overhead pipes and cables is to suspend such frames from structural members such as I-beams, channels and angles, and it is to a connecting means or clamp for this purpose that the present invention is particularly directed.

It is an object of this invention to provide an improved beam clamp for conduit supports or the like, and to provide a beam clamp of simple, durable and easily applied parts adapted to a variety of uses and combinations. Other and more specific objects and advantages of the invention are made apparent in the following specification wherein reference is made to the accompanying drawings for a detailed disclosure of the invention.

In the drawings:

Fig. 1 is a perspective view of a simple conduit support assembly secured to the flange of an I-beam by a beam clamp structure embodying the present invention.

Fig. 2 is a fragmentary view in front elevation of the same beam clamp structure, part of the conduit support being broken away.

Fig. 3 is a sectional view on the line III—III of Fig. 2 with the I-beam removed.

Fig. 4 is a perspective view of one part of the beam clamp of the present invention, and Fig. 5 is a perspective view of another part of the clamp.

In Figs. 1 and 2 of the drawings, a portion of an I-beam having a web 10 and flange 11 is shown as typical of any flanged structural member or members to which a conduit supporting beam may be attached. A simple form of conduit supporting beam is shown in these figures as comprising a pair of opposed perforated channel shaped members 12 and 13. Any number of conduits, two of which are shown for purposes of illustration at 14 and 15 may be supported with relation to the members 12 and 13 as by means of cable or conduit clamps 16 and 17 of well known type which have parts entering through the spaces between the channel members 13 and 14 and engaging behind the flanges thereof in a manner well known in this art. The perforations shown at 18 in the channels 12 and 13 are equally spaced as for example on 1 inch centers and serve in conjunction with various types of fittings to enable the construction of frame work of different shapes for supporting various numbers and arrangements of cables or conduits as may be required. The conduits 14 and 15 herein shown are representative only, as many more conduits may be supported on the beam shown as well as on other beams supported thereby or otherwise related thereto.

The present invention is directed particularly to the means for supporting the beam made up of the channels 12 and 13 with relation to the I-beam shown or other flanged structural member. The beam clamp which accomplishes this purpose comprises two principal parts in the form of an angle plate shown in Fig. 4 and a U-shaped spacer shown in Fig. 5.

The angle plate shown in Fig. 4 is in the form of a short piece of strap iron having a right angle bend therein to form a long part 20 with the perforation 21 therein and a short part 22. The end of the part 22 has a single lug 23 projecting centrally therefrom, while the long part 20 has two lugs 24 and 25 spaced from the central portion of the strap-like stock from which the angle plate is made. The particular purpose of the lugs 23, 24 and 25 will presently be referred to though it may be seen by reference to Fig. 4 of the drawings that they are easily and efficiently provided when the part is cut from a piece of band iron or the like as a single cut provides the lug 23 on one end of one angle plate and the lugs 24 and 25 on the adjacent end of the next plate to be cut from the same stock.

The U-shaped spacer member shown in Fig. 5 comprises a curved portion 26 with two flat portions 27 and 28 extending therefrom in parallel relation to each other. The two flat portions 27 and 28 are provided with alined holes 29 for the reception of a bolt or the like. The flat portions 27 and 28 are also cut away on their top edges and bottom edges to provide shoulders 30 and 31 respectively, and the shoulders 31 are spaced a greater distance from the curved part 26 than are the shoulders 30.

The U-shaped spacer shown in Fig. 5 serves, as illustrated in Figs. 1, 2 and 3, to locate and support a clamping bolt 32 associated with the angle plate shown in Fig. 4 and serves also by means either of its shoulders 30 or 31 to abut the edge of the I-beam flange 11 and therefore to provide spacing between the angle plates suitable for I-beams or other structural members of any size. A still further function of the U-shaped spacer shown in Fig. 5 is to establish and maintain the proper spacing between the edges of the flanges of the channels 12 and 13. In order to accommodate the clamping devices to structural flanges of different widths, the U-shaped spacer is held in place by a bolt such as shown at 35 which extends through alined perforations 18 in the channel members, and also through the alined perforations 29 in the spacer. Because of the fact that the perforations 18 in the channels 12 and 13 are spaced at 1 inch intervals, accommodation in increments of 1 inch to structural flanges may readily be obtained. Even closer accommodation, however, may be obtained because of the arrangement of the shoulders 30 and 31 on the spacer. These shoulders differ about ⅓ inch in their positions on the spacer so that by inverting either one of the two spacers employed or by inverting both of the spacers, variation in the spacing of the clamping members may be obtained in increments of ⅓ inch. For example, in Fig. 2 the shoulder 31 of the U-shaped spacer is shown as engaging the edge of the flange 11 of the I-beam while if the spacer were inverted during assembly, the shoulder 30 would occupy the position of the shoulder 31 to receive an I-beam ⅓ inch wider than that shown. As the spacers used are in pairs, one for abutment of each of the opposite edges of the flange of the structural member or I-beam, the spacing in ⅓ inch increments is readily accomplished.

The U-shaped plate, being held securely in position with relation to the channel members 12 and 13 by means of the bolt 35, serves to locate and receive the bolt 32 which passes through the perforation 21 in the angle plate. By tightening the nut on the bolt 32 the angle plate is drawn into close contact with one side of the I-beam flange 11 and serves to clamp said flange between itself and the channel members 12 and 13. The angle plate is held against rotation during this clamping action because the lug 23 on its short end 22 is disposed within the space between the channel members 12 and 13, the lugs 24 and 25 on the long end 20 serve to bite into or securely engage the surface of the I-beam flange 11.

Thus, with two members relatively simple and inexpensive to manufacture and two common bolts, the channel members 12 and 13 are properly spaced with relation to each other and securely clamped to the flange of a structural member of any dimension.

As pictured in Fig. 1, a single conduit supporting beam is clamped to the flange of an I-beam. It is to be understood, however, that a framework of similar beams of various arrangement may depend from and be supported by the beam shown in Fig. 1. In this connection, the U-shaped spacer shown in Fig. 5 serves a further purpose as it may occupy the position illustrated at 40 in Fig. 1 adjacent the end of the conduit supporting beam where it is secured as by a bolt 41 and where it serves as a receptacle and support for a threaded hanger rod 32 held against vertical movement by nuts 33 and 34. This hanger rod 32 may extend downwardly any desired distance and further supporting beams made up of channels like those shown at 12 and 13 may be carried by the hanger rod 32 in an obvious manner with the aid of U-shaped spacers occupying a position corresponding to that shown at 40 in Fig. 1.

We claim:

1. Means to clamp a slotted conduit support or the like to a beam flange comprising a U-shaped member secured to the conduit support within the slot thereof, an angle member having an edge resting on the support and an edge overlying the beam flange, and means passing through both members to engage the flange between the support and the angle member.

2. Means to clamp a slotted conduit support with spaced perforations to a beam flange comprising a U-shaped member fitting within the slot of the support and perforated to receive a securing bolt extending through perforations in the support, a perforated angle member having an edge resting on the support and an edge overlying the flange, and a bolt extending through the U-shaped member and the angle member to clamp the flange between the angle member and the support.

3. Means to clamp a slotted conduit support with spaced perforations to a beam flange comprising a U-shaped member fitting within the slot of the support and perforated to receive a securing bolt extending through perforations in the support, a perforated angle member having an edge resting on the support and an edge overlying the flange, and a bolt extending through the U-shaped member and the angle member to clamp the flange between the angle member and the support, said U-shaped member having a shoulder projecting beyond the support for engagement with the edge of the beam flange.

4. Means to clamp a slotted conduit support with spaced perforations to a beam flange comprising a U-shaped member fitting within the slot of the support and perforated to receive a securing bolt extending through perforations in the support, a perforated angle member having an edge resting on the support and an edge overlying the flange, and a bolt extending through the U-shaped member and the angle member to clamp the flange between the angle member and the support, said U-shaped member having a shoulder projecting beyond the support for engagement with the edge of the beam flange, and a similar but differently spaced shoulder on its opposite side to engage the edge of a beam flange of different size upon reversal of the U-shaped member with respect to the support.

5. For combination with a slotted conduit support comprising a pair of spaced channel shaped members, a U-shaped fitting with alined perforations formed in the leg portions thereof adapted to be received and secured between said channel members to form a spacer and to provide a support for a hanger rod associated with the conduit support.

HARRY L. KINDORF.
ORLAN C. KINDORF.

REFERENCES CITED

The following references are of record in the file of this patent:

UNITED STATES PATENTS

| Number | Name | Date |
|---|---|---|
| 497,679 | Newbury | May 16, 1893 |
| 1,787,533 | Kerschner | Jan. 6, 1931 |